United States Patent
DeMent et al.

(10) Patent No.: US 7,055,004 B2
(45) Date of Patent: May 30, 2006

(54) PSEUDO-LRU FOR A LOCKING CACHE

(75) Inventors: Jonathan James DeMent, Austin, TX (US); Ronald Hall, Cedar Park, TX (US); Peichun Peter Liu, Austin, TX (US); Thuong Quang Truong, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 321 days.

(21) Appl. No.: 10/655,366

(22) Filed: Sep. 4, 2003

(65) Prior Publication Data

US 2005/0055506 A1    Mar. 10, 2005

(51) Int. Cl.
*G06F 12/12*    (2006.01)
(52) U.S. Cl. .............. 711/136; 711/160; 711/133; 711/134; 711/159; 707/104.1
(58) Field of Classification Search ........... 711/136, 711/160
See application file for complete search history.

(56) References Cited

U.S. PATENT DOCUMENTS

| | | | |
|---|---|---|---|
| 5,594,886 A * | 1/1997 | Smith et al. ........... | 711/136 |
| 5,796,978 A | 8/1998 | Yoshioka et al. | |
| 6,425,058 B1 | 7/2002 | Arimilli et al. | |
| 6,430,656 B1 | 8/2002 | Arimilli et al. | |
| 6,430,667 B1 | 8/2002 | Loen | |
| 6,826,652 B1 | 11/2004 | Chauval et al. | |
| 2003/0159003 A1* | 8/2003 | Gaskins et al. ........... | 711/128 |
| 2004/0143708 A1* | 7/2004 | Caprioli ........... | 711/136 |

OTHER PUBLICATIONS

Demaine, Erik D. "Cache-Oblivious Algorithms and Data Structures", Lecture Notes in Computer Science, BRICS, University of Aarhus, Denmark, Jun. 27-Jul. 1, 2002, pp. 1-29.*
Al-Zoubi et al. "Performance Evaluation of Cache Replacement Policies for the SPEC2000 Benchmark Suite". 2004. Proceedings of the 42nd Annual ACM Southeast Regional Conference, ACM, pp. 267-272.*

* cited by examiner

*Primary Examiner*—B. James Peikari
(74) *Attorney, Agent, or Firm*—Carr LLP; Diana R. Gerhardt

(57) ABSTRACT

The present invention provides for a cache-accessing system employing a binary tree with decision nodes. A cache comprising a plurality of sets is provided. A locking or streaming replacement strategy is employed for individual sets of the cache. A replacement management table is also provided. The replacement management table is employable for managing a replacement policy of information associated with the plurality of sets. A pseudo least recently used function is employed to determine the least recently used set of the cache, for such reasons as set replacement. An override signal line is also provided. The override signal is employable to enable an overwrite of a decision node of the binary tree. A value signal is also provided. The value signal is employable to overwrite the decision node of the binary tree.

24 Claims, 5 Drawing Sheets

PSEUDO-LRU FOR A LOCKING CACHE

CROSS-REFERENCED APPLICATIONS

This application relates to co-pending U.S. patent applications entitled "SOFTWARE-CONTROLLED CACHE SET MANAGEMENT" (application Ser. No. 10/655,367, and "IMPLEMENTATION OF A PSEUDO-LRU ALGORITHM IN A PARTITIONED CACHE" (application Ser. No. 10/655,401, filed concurrently herewith.

TECHNICAL FIELD

The invention relates generally to cache management and, more particularly, to locking, unlocking and streaming sets of a cache.

BACKGROUND

Typically, caches are small, fast storage buffers employable to store information, such as instruction code or data, in order for a processing device to more quickly and efficiently have access to the information. Typically, it is faster for the processing device to read the smaller memory of the cache than to read a main memory. Also, with the rapid increase of intensive computational requirements, such as graphical processing and advanced numerical analysis, their importance in a computing system will only increase.

A cache is a limited resource. One way to allocate sets of a cache is to employ a least recently used (LRU) function to determine replacement of sets. Given the LRU information, the cache determines the last set accessed with the cache in the case of a cache miss. The cache replaces the LRU information within requested information in the event of a cache miss; that is, the cache did not have the requested information. This replacement allows the processor to quickly access the selected new information the next time this information is selected. Furthermore, this replacement also increases the chances of the processor finding associated information, as the replaced set cache data is likely to have temporal or spatial locality.

However, there are issues related to the employment of LRU functionality in caches. One such issue is that information to be stored to a cache does not utilize the cache in the same way. For instance, some information, such as streaming graphics, should ideally be immediately erased from the cache after the processor is finished reading the appropriate cache set, because this data is not to be used again. However, the LRU function would not immediately erase the streamed information, as the information would not necessarily be the least recently used. This results in an inefficient utilization of cache resources. Information selected by the processor a plurality of times would be erased by the LRU functionality if this data becomes the least recently used. For example, information that is accessed infrequently, but is critical to processor performance, could be erased.

Furthermore, there are also issues related to the interplay between an LRU function, such as a pseudo-LRU (pLRU) and the cache in real-time. For instance, real-time systems, such as a missile trajectory controller, needs both very fast access to algorithmic code and continual updating and replacement of navigation data, such as wind velocity. If the navigation data replaces the code in the cache, the length of time needed for operation of the controller becomes changeable, thereby leading to variances in the controller's real-time operations. Therefore, what is needed is cache information management that overcomes the limitations of conventional cache information management.

SUMMARY OF THE INVENTION

The present invention provides for cache accessing through employment of a replacement management table. A replacement management table is employable to modify decision nodes of a least recently used binary tree implementation. A tag replacement control indicia is generated by the replacement management table. Information is extracted from the tag control replacement indicia. An override signal is created for an associated decision node of the binary tree as a function of extracted information. A value signal is created for the associated decision node of the binary tree as a function of the extracted information. The associated decision node is overwritten as a function of the value signal if the override signal enables the overwriting.

BRIEF DESCRIPTION OF THE DRAWINGS

For a more complete understanding of the present invention, and the advantages thereof, reference is now made to the following Detailed Description taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combination thereof. In a preferred embodiment, however, the functions are performed by a processor, such as a computer or an electronic data processor, in accordance with code, such as computer program code, software, and/or integrated circuits that are coded to perform such functions, unless indicated otherwise.

Figure 1:
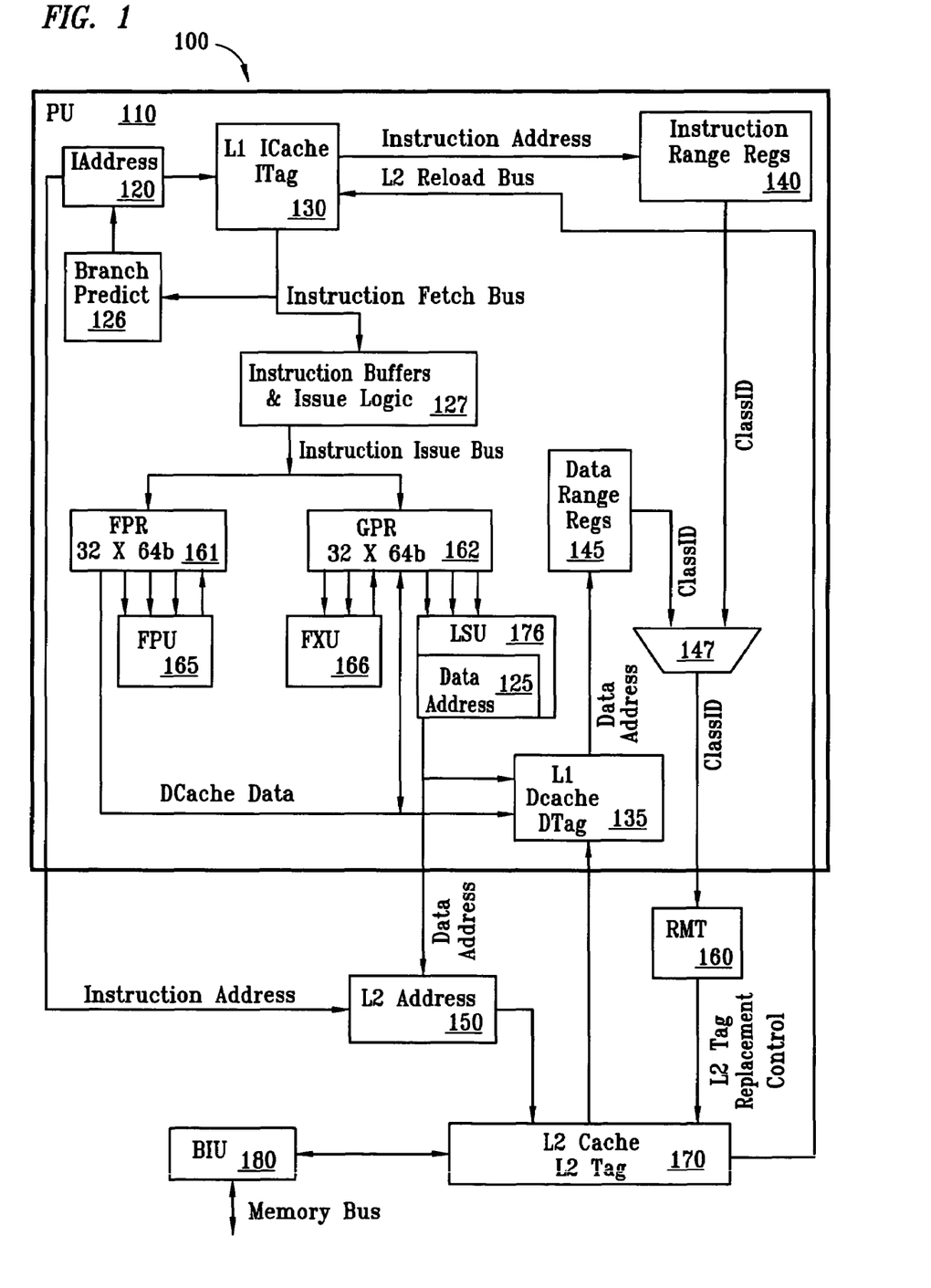
FIG. 1 schematically depicts a cache set access system.

Referring to FIG. 1, generally, a cache access environment 100 provides a cache set access. The cache set access environment 100 employs software to manage a cache set replacement algorithm. The software allows the sets of an L2 cache 170 to be associated with different replacement strategies, implemented within a replacement management table (RMT) 160, for different requested memory address ranges.

There are at least three general replacement strategies of sets made by the RMT 160. The first is a "locking," the second a "streaming" and the third is "opportunistic" replacement. The locking set is used for keeping instructions or data in a set of the L2 cache 170 that the software designates as dedicated to a certain address range. An example of this is a first level interrupt handler that the operating system of the cache environment 100 selects to lock, or stay resident in, a given set of the L2 cache 170.

The streaming set is generally employed when a processor accesses large amounts of memory with no temporal locality (that is, the information in the L2 cache 170 will be used once, then discarded). Therefore, the set employable for streaming is overwritten with data corresponding to two or more address ranges, rather than just the one address range of the locked set. Streaming allows the overwriting of sets within the L2 cache 170 with data that has no temporal locality. Among the allowable replacement sets for a given address range, the pLRU functionality determines which set of the L2 cache 170 is the best set to replace.

The information is defined as streaming to the allowable replacement sets within the L2 cache 170 if there are at least two classID indicia that allow the replacement of the same sets. A classID indicia is generally defined as indicia of the corresponding range into which an address miss of a cache falls. Finally, there is the opportunistic replacement, a catch-all provision for allowable replacement sets for an undefined address range classID.

In FIG. 1, the reference numeral 100 generally designates a high-level environment in which an L2 cache 170 with locking sets is employed. The environment 100 comprises a main processor unit (MPU) 110, the coupled L2 cache 170 and a memory bus 180. In one embodiment, the MPU 110 comprises a reduced instruction set (RISC) IC processor.

The MPU 110 comprises an instruction register 120 and a data register 125. The instruction register 120 is coupled to a level one (L1) instruction cache 130. The data register 125 is coupled to an L1 data cache 135. The L1 instruction cache 130 is coupled to a first range register 140. The L1 data cache 135 is coupled to a second range register 145. A MUX 147 is coupled to both the registers 140, 145 and further coupled to an RMT 160, which is coupled to the L2 cache 170.

Both the instruction register 120 and the data register 125 are coupled to the L2 register 150. The L2 register 150 is coupled to the L2 cache 170. The L2 cache 170 is divided into a plurality of sets. Each set is correlated to at least one address range within the RMT 160. If the requested information is not in the L2 cache 170, these sets are updated with the requested information. The sets are updated according to whether the sets are locked or not locked, as defined by the RMT 160. The determination of which set is locked or streamed for a requested memory address comprises a function of the requested address. Generally, in the cache environment 100, a pLRU function employs selection among sets for a given corresponding classID indicia, for any plurality of sets allowed for replacement by the RMT 160. Although, in FIG. 1, the L1 caches 130 and the L2 cache 170 are illustrated, those of skill in the art understand that other caches, or other temporary information storage devices, such as a translation look-aside buffer, can also be employed.

Generally, in the MPU 110, the instruction address register 120 commands an L1 instruction cache 130 to retrieve instructions from the memory of the L1 instruction cache 130. In the environment 100, the address register 120 first checks the tag indicia of the L1 instruction cache 130 for an information request. If the requested information, corresponding to a specific address, is stored in the L1 instruction cache 130 according to the tag indicia of the L1 instruction cache 130, the requested information is then placed in an instruction buffer 127, decoded, and issued as an instruction to a floating point register (FPR) 161 and a general purpose register (GPR) 162. Generally, the decoded instructions are stored by registers 161 and 162. In one embodiment, a branch predictor 126 is also employed. Typically, the branch predictor 126 makes predictions as to the outcome of a particular L1 instruction cache 130 access, and executes instructions based upon this prediction. In FIG. 1, the FPR register 161 is coupled to a floating point unit (FPU) calculator 165, and the register 162 is coupled to a fixed point unit (FXU) calculator 166 and a local store unit (LSU) 176. The registers 161, 162 and the LSU 176 are coupled to an L1 data cache 135.

In the event of a hit in the L2 cache 170, the hit information is forwarded to the requesting L1 instruction cache 130 or the L1 data cache 135. From the caches 130, 135, the information is accessible by the CPU (not shown) of the MPU 110.

However, if the tag indicia of the L1 instruction cache 130 indicates that the desired information is not stored in the L1 instruction cache 130, the address register 120 sends the requested address to an L2 address register 150 to determine whether the requested information is in the L2 cache 170 instead. Furthermore, if the tag information of the L1 instruction cache 130 indicates that the desired information is not stored in the L1 instruction cache 130, the requested address is sent to the range register 140. Similarly, a miss in the L1 data cache 135 sends the corresponding address to the range register 145 and a request to the L2 address register 150. In the event of a miss of the L1 data register 125, the desired data address derived from the instruction register 120 is transmitted to the data range register 145. Generally, the data address register 125 is then multiplexed with the output of the instruction register 120, in the L2 register 150, in the event of a miss of the L1 data cache 135.

In the range registers 140 and 145, the address that was not found in the L1 instruction cache 130 or L1 data cache 135, respectively, is tested to determine whether the selected address falls within a range of memory addresses. If it does not, a "default" class identifier indicia (classID) is generated. However, if the selected address does fall within the range of memory addresses associated with the range registers 140, 145, a classID is created corresponding to the appropriate address range, such as classID 1, classID 2, and so on. The classID is transmitted through a MUX 147 to the RMT 160.

Generally, a class identifier is employed as an index to a row of the RMT 160. The RMT 160 generally determines whether a given set of the L2 cache 170 is to be treated as locked, streamed or opportunistic by the information corresponding to a memory address associated with a given set. The status information of a row of the classID is then converted to an L2 tag replacement control. The RMT 160 transmits the L2 tag replacement control indicia to the L2 cache 170.

Typically, the L2 register 150 checks the tag of the L2 cache 170 to determine if the desired information is stored in the L2 cache 170. If the desired information is found in the L2 cache 170, the information is retrieved from the L2 cache 170 and the L2 tag replacement control indicia is employed to update the pLRU binary tree.

However, if the selected address is not found in the L2 cache 170, the corresponding requested information is retrieved from a main memory, such as through the memory bus 180. This retrieved information is then stored in a set of the L2 cache 170. However, the information that is stored in the L2 cache 170 is stored in a set of the L2 cache 170 as a function of the received L2 tag replacement control indicia. For instance, addresses falling within the classID indicia of "one" could be targeted as always locked and stored in set four of the cache 170, depending upon the particular software configuration of the RMT 160. Addresses falling within classID indicia of "three" and "four" could both be selected to overwrite the same set in the L2 cache 170, thereby creating a streaming set. A classID indicia of "zero" could require that all sets of the L2 cache 170 not replace sets zero through three. In other words, class "zero" has exclusive replacement for sets "zero" through "three" of the L2 cache 170. These directives would be conveyed to the L2 cache 170 by the tag replacement control indicia. These directives could also be modified by software, so that different locking sets are defined for different given classIDs.

Figure 2:
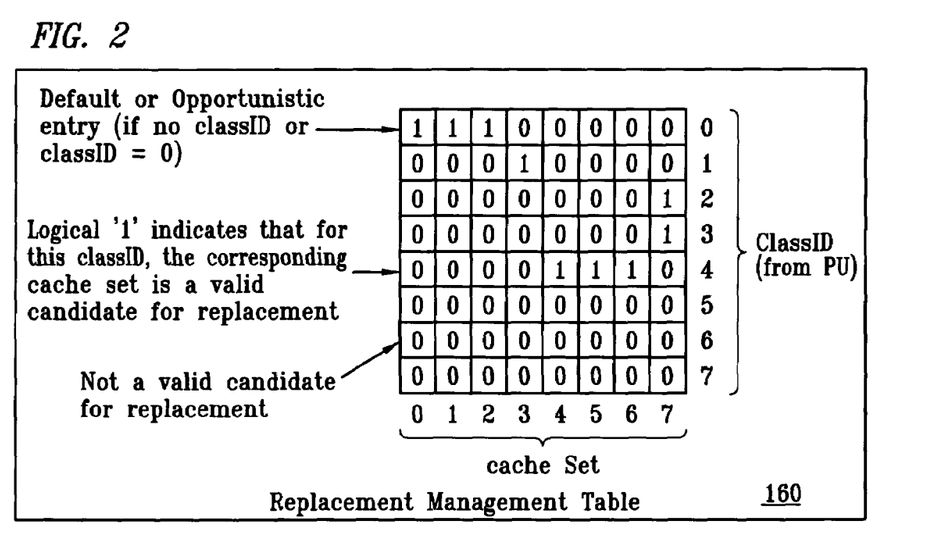
FIG. 2 schematically depicts a replacement management table.

Turning now to FIG. 2, schematically illustrated is a replacement management table 160. The table 160 comprises a matrix of classIDs, generated by the registers 140, 145 crossed with the defined sets of the L2 cache 170. Generally, the table 160 illustrates the decisions made by software of the operating system of the environment 100 as to the replacement management status of the sets within the L2 cache 170, as they correlate to a given classID.

In FIG. 2, the RMT 160 is a software managed table. Software maintains the structure and interprets the meaning of the RMT 160 entries. In a further embodiment, no hardware checks of the RMT 160 for accuracy are made. Generally, the RMT 160 is employed in the mapping of a missed address range to a set or sets of the L2 cache 170. In one embodiment, the address range is an effective address range. In the registers 140, 145, the missed address is mapped to a classID indicia. Generally, the classID indicia represents a given address range. For instance, an address range of 1–64K is classID indicia 1, an address range of 65–128K is classID indicia 2, and so on. In one embodiment, classID 0 corresponds to any address range that is not specifically provided for by the other classIDs. The given classID is then transmitted to and employed as an index by the RMT 160. Using the classID as an index, the RMT 160 then looks up in the RMT 160 the various sets that are eligible for replacement and generates the tag replacement control indicia therefrom.

In FIG. 2, the RMT 160 is a matrix of eight by eight. In other words, the L2 cache 170 is 8-way set associative (that is, it has 8 sets). Therefore, each RMT 160 entry has 8 bits. In FIG. 2, the RMT 160 has "1"s defined in classID indicia row 0, from sets 0 through 2, and "0"s in the rest of the row. Therefore, for classID 0, if the data is to be updated to the L2 cache, it can be updated in the first three sets, sets 0 through 2, of the L2 cache. Furthermore, the classID 0 has exclusive use of these sets. Therefore, sets 0 through 2 of the L2 cache are locked to the classID 0. In one embodiment, classID 0 corresponds to an undefined address range. That is, an address miss that is not specifically provided for in the range registers 140, 150 is given a default classID 0.

For classID 1, the RMT 160 has a "0" defined in sets 0 through 3 and sets 5 through 7, and a "1" for set 4. Any data corresponding to classID 1 is not to be placed in sets 0 through 3 and sets 5 through 7. Instead, the data is placed in set 4. As classID 1 has exclusive employment of set 4, set 4 is locked to classID 1.

ClassID 2 and classID 3 both replace the same set, set 8. Therefore, both classID 2 and classID 3 stream to set 8. ClassID 4 has a plurality of sets that are valid candidates for replacement. These are sets 4, 5 and 6. Because sets 4, 5 and 6 are employed exclusively by classID 4, sets 4, 5 and 6 are locked to classID 4.

In the illustrated embodiments, classIDs 5 through 8 are not used. That is, all entries in each classID is "0". However, those of skill in the art understand that the logical set and classID determinations expressed as "1"s and "0"s as shown in FIG. 2 are for purposes of illustration, and that other logical set and classID determinations are within the scope of the present invention, such as through software.

This replacement of information within the allowed sets is performed by the pLRU function as modified by the RMT 160. Similarly, information corresponding to any other classID is replaced in the various sets of the L2 cache 170 according to the software managed RMT table 160 and the pLRU function.

Figure 3A:
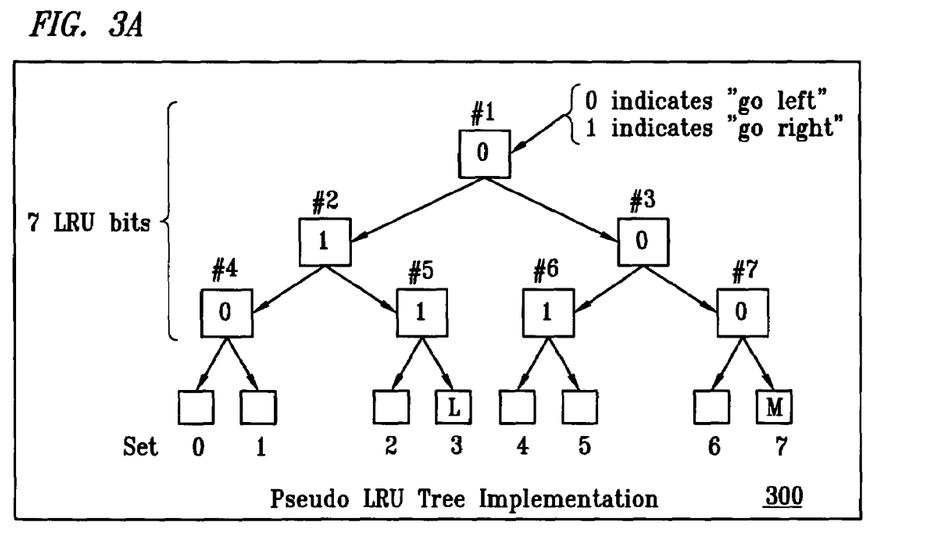
FIG. 3A schematically depicts a pseudo-LRU tree implementation.

Turning now to FIG. 3A, illustrated is pseudo-LRU {pLRU} binary tree 300. Generally, the pseudo-LRU binary tree 300 employs a replacement policy by which, to a good approximation, the least recently used data in a set of the cache is the data that is selected for replacement when new data is to be brought into the L2 cache 170 and there is no empty set to place it in. However, the pLRU tree 300 is subject to being overridden by the tag replacement control indicia of the RMT 160.

Typically, there are two conditions which exist before employing the replacement policy contained within the decision nodes of the pLRU binary tree 300. The first condition is that an L2 cache 170 miss occurs. The second condition is that all the allowed replacement sets of the L2 cache 170 hold valid data, according to the RMT 160. When the miss of data occurs according to the tag of the L2 cache 170, the pLRU binary tree 300 is combined with tag replacement control indicia within the L2 cache 170. This combination tells the L2 cache 170 into which set new data is to be placed.

The pLRU binary tree 300 is implemented as a binary tree algorithm. Each set constitutes a leaf node of the binary tree 300, as shown in FIG. 3A. Any node of the binary tree 300 that is not a leaf node is a decision node.

As is understood by those of skill in the art, a pLRU binary tree 300 is traversed by reading a decision node of the binary tree and traversing down a branch of the tree based upon that reading. In one embodiment, the left branch is traversed, from top to bottom, if the value of the decision node is a "0", and the right branch is traversed if the value of the node is a "1".

When the L2 cache 170 is to determine the least recently used set, for such reasons as replacement of information within a set, the pLRU binary tree 300 is traversed from top to bottom based upon the decision nodes. For instance, in FIG. 3A, the cache L2 would first traverse left from decision node #1 to decision node #2, traverse right from decision node #2 to decision node #5, and traverse right one more time to get to the set 3, corresponding to the least recently used set. The leaf node arrived at by traversing the pLRU binary tree 300 is overwritten if there is a miss for a given piece of information in the L2 cache 170.

For both a hit or a miss of requested data in the L2 cache 170, the pLRU binary tree 300 is updated. Generally, this is because, for a miss of data within the pLRU binary tree 300, the pLRU binary tree 300 is traversed downwards and the LRU leaf node is overwritten with new data. However, if a hit occurs in the L2 cache 170, then the hit leaf node is no longer the LRU leaf node. In either case, the pLRU binary tree 300 is updated according to the RMT 160.

Generally, updates of the pLRU binary tree 300 occur by inverting the logic level of the decision nodes between the replaced or accessed leaf node set, up to and including the root decision node. For instance, in FIG. 3A, if set three is overwritten with data, decision node #6 is set to 1, decision node #2 is set to 0, and decision node #1 is set to 1. Therefore, on the next down traversal, the root node is 1, thereby traversing down the right hand side of the tree 300 to find the next pLRU set leaf node. However, if set 1 is accessed (that is, a "hit" occurs), then decision node #4 is given a logic level 1, decision node #2 is given a logic level 0, and decision node #0 is given a logic level 1. Altering the decision nodes from the set node to the root decision node when the set is overwritten or accessed alters the order of the LRUs for the different set leaf nodes.

However, the RMT 160 can effectively temporarily override the selected pLRU leaf node set in the pLRU tree 300 within the L2 cache 170. In other words, the RMT 160 can stop the pLRU binary tree from overwriting a set or sets, or can force it to overwrite a particular set, for information that corresponds to a given classID. To accomplish the overriding, two signals, as indicated by the tag replacement control indicia, are generated from the RMT 160 and transmitted to the pLRU binary tree 300 decision node or nodes. These signals are the "override" signal and the "value" signal. Generally, the override signal denotes whether a given decision node in the pLRU binary tree 300 is to employ value indicia or the default pLRU logic level (that is, the logic level existing in the decision node without being overridden by the RMT 160). The value signal indicates which direction the tree 300 is traversed to take in determining the least recently used set.

The data within the binary tree 300 itself is not changed by the RMT 160. Instead, branches of the binary tree 300 are selected by the RMT 160 for set replacement and overwriting. Once the overwriting has occurred, the binary tree 300 is updated as a function of the branch selection performed by the RMT 160.

Figure 3B:
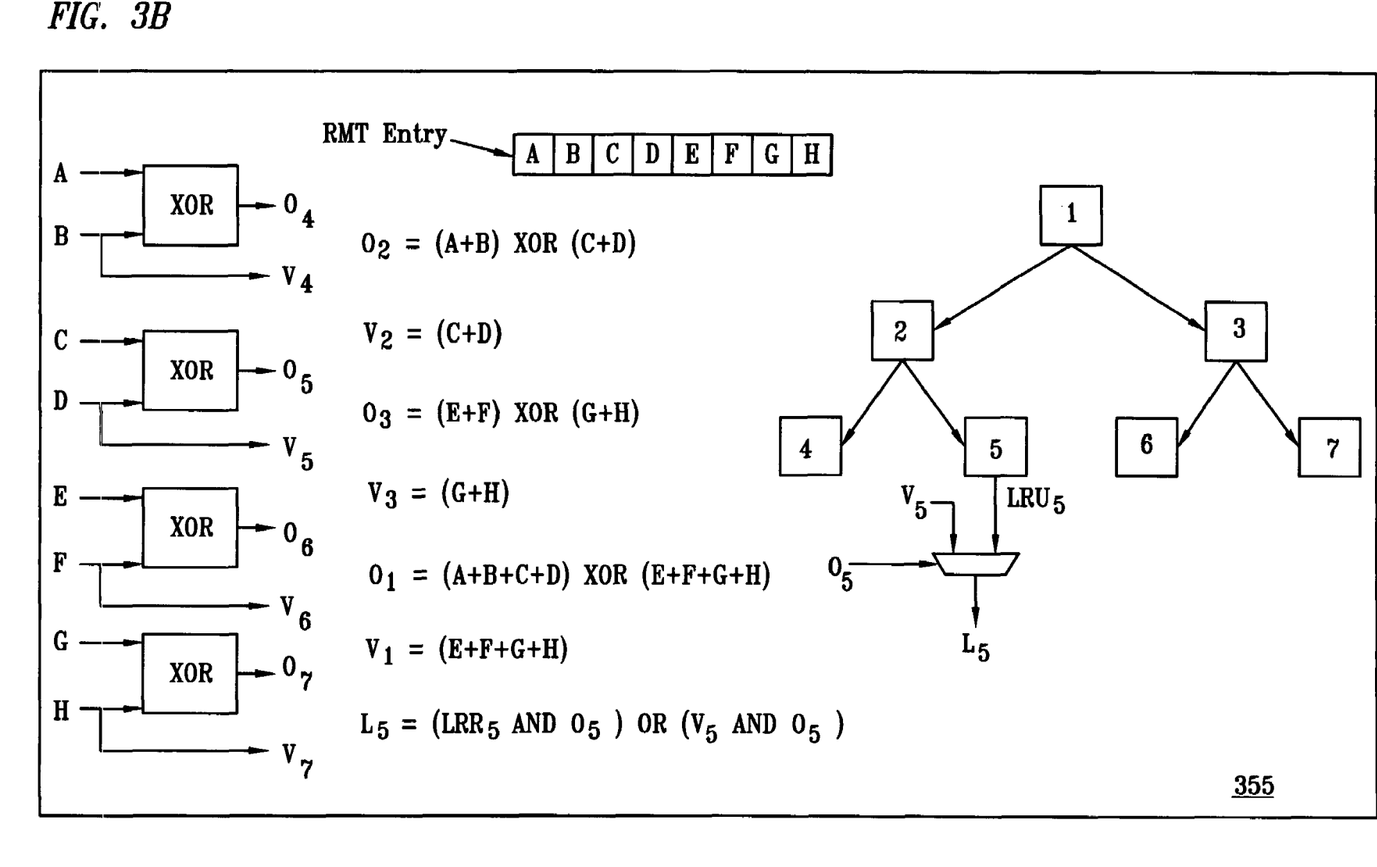
FIG. 3B schematically depicts a derivation for the override and value signals employable to overwrite the fifth decision node in the pseudo-LRU tree.

Turning now to FIG. 3B, schematically depicted is a derivation for the override and value signals employable to overwrite the fifth decision node in the pLRU binary tree 300. Typically, the relevant decision nodes of the pLRU binary tree 300 are updated when their corresponding associated override signal is a "0", and the default pLRU logic level remains the same when the override signal is a "1".

In FIG. 3B, a multiplexer (MUX) 355 is illustrated as coupled to the decision node 5 and its corresponding override signal and value signal for 8-way associative cache sets. For the decision node 5, the override and value signals for sets A through H, defined as locked or unlocked by the software managing the RMT 160, are derived as follows:

(1) $O_5 = C \text{ XOR } D$ (2) $V_5 = D$

Therefore, (3) $L_5 = \{LRU_5 \text{ and not } (O_5)\}$ or $(V_5 \text{ and } O_5)$.

In other words, the MUX 355 is overridden by the $O_5$ value if the C set has a different logic value than the D set. The value that is used as the value of the D set is "1" if set D is a valid candidate for replacement and 0 if set D is not a valid candidate for replacement. Therefore, if there is no override signal, the first term of equation (3) is positive if $L_5$ is positive and negative if $L_5$ is negative. In other words, a default situation occurs. However, if $O_5$ is positive, the signal $L_5$ produced by the MUX 355 is positive if $V_5$ is positive and negative if $V_5$ is negative. If $O_5$ is positive, the $V_5$ value overrides the decision node 5, altering the logic level of a decision node of the pLRU binary tree 300. This, in turn, can alter the tree traversal route of a present or future tree traversal, thereby overriding the logic levels of the pLRU binary tree 300.

The pLRU binary tree 300 is updated for the case of both an L2 cache 170 hit and an L2 cache 170 miss. The updating of the pLRU binary tree 300 is a function of the RMT 160. Generally, for either a hit or a replacement, the decision nodes of the binary tree 300 are updated for those nodes for which an override signal was "0". If the override signal is "1" for a given decision node, then node update should not be performed upon this decision node.

Although FIG. 3B is shown with the MUX 355, those of skill in the art understand that the MUX 355 can be embodied in hardware or software. Furthermore, each decision node of the pLRU binary tree 300 can have its own associated MUX 355 that is operable to override the logic level existing in a given decision node of the pLRU binary tree 300.

Figure 4A:
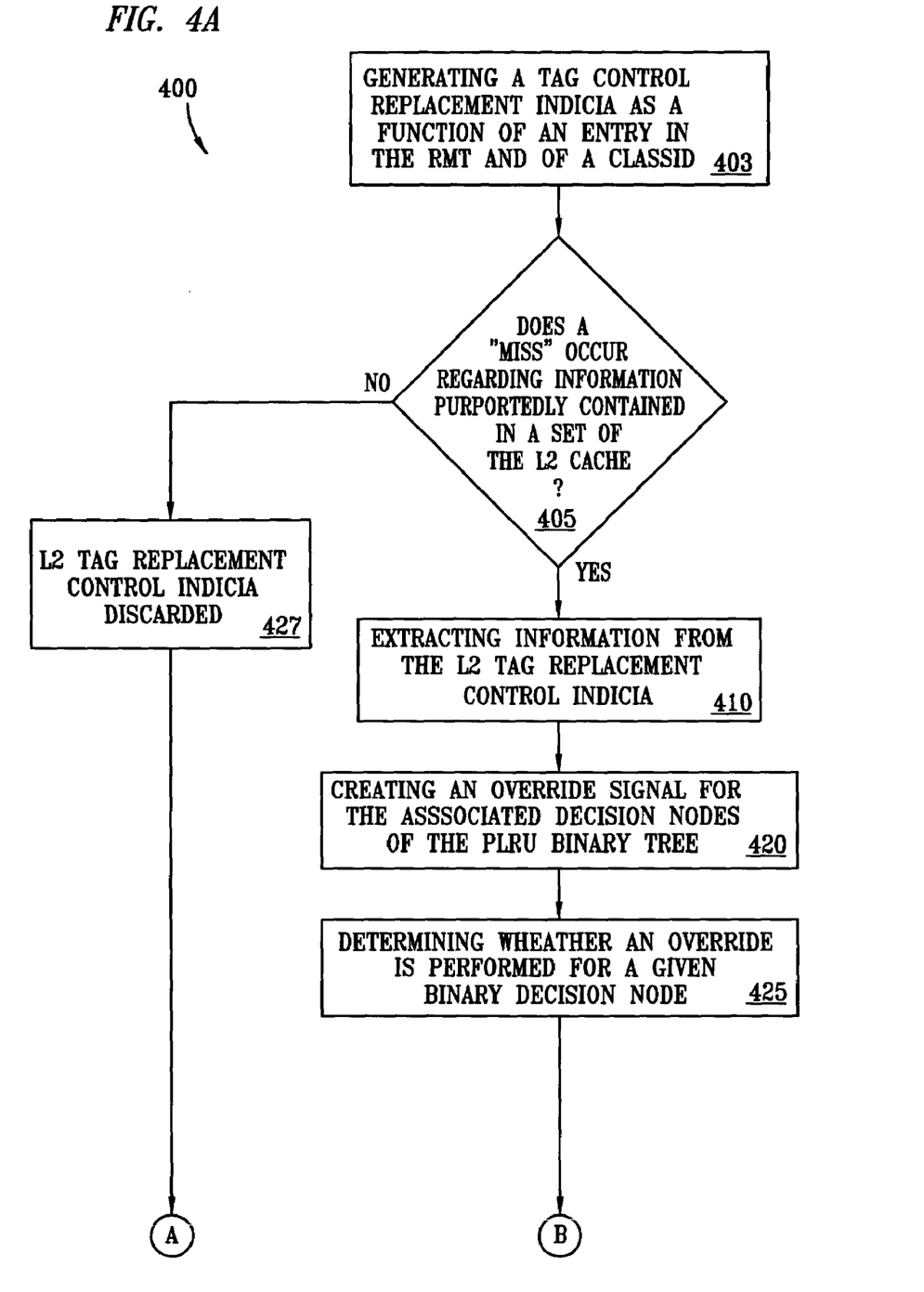
FIGS. 4A and 4B illustrate a method for employing the pseudo-LRU tree with the replacement management table.
Figure 4B:
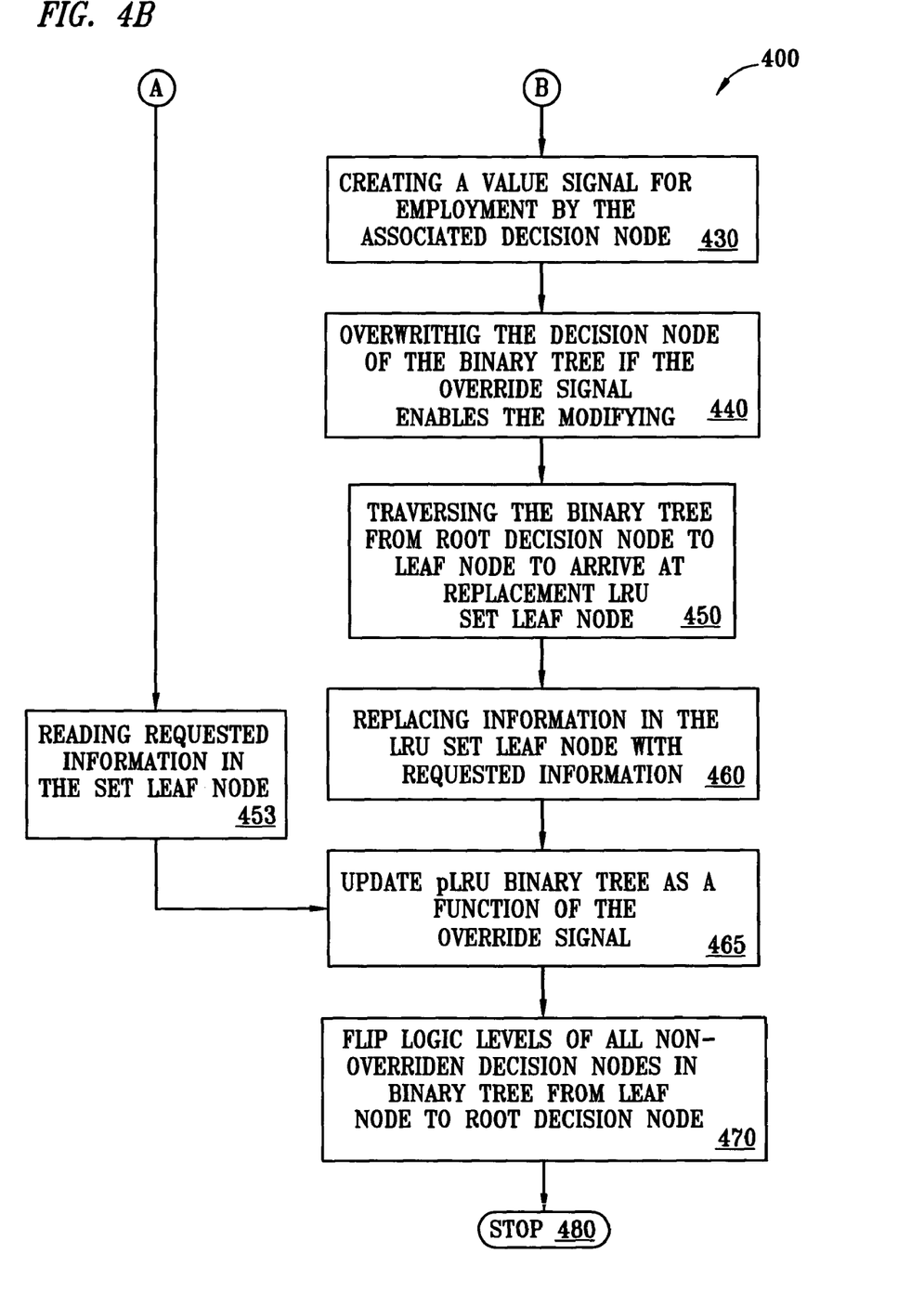

Turning now to FIGS. 4A and 4B, illustrated is a method 400 for employing the pLRU binary tree 300 with the replacement management table 160. In step 403, the RMT 160 generates a tag control replacement indicia as a function of an entry in the RMT and a classID. For example, the entry of FIG. 2 for classID 1 is "1, 1, 0, 0, 0, 1, 1, 0." In step 405, the cache 170 receives the tag replacement indicia.

If a hit of requested data occurs in the L2 cache 170, step 405 executes step 427. In step 427, the L2 tag replacement indicia is discarded. In other words, no decision node of the binary tree is modified as a function of the discarded L2 tag control indicia. In step 453, the "hit" of the requested information is then read from the appropriate set of the L2 cache 170.

In step 410, specific information within the L2 tag replacement indicia is extracted. This extracted information is then employed in step 420. In step 420, the override signal is generated for the appropriate decision nodes of the pLRU binary tree 300. The override signal is generated from the L2 tag replacement control indicia, which was, in turn, generated from the interplay between the RMT 160 and the classID.

In step 425, the override signal is read for a decision node of the pLRU binary tree 300. In one embodiment, the override signal is tested for all nodes of the pLRU binary tree 300. Then, step 425 determines if a given decision node of the pLRU binary tree 300 is to be overridden. If the decision node is not to be overridden, the value within the decision node remains unaltered.

However, if the decision node is to be overridden, step 430 creates the value signal for each decision node to be overridden. Step 440 overrides the decision node of the pLRU binary tree 300 if the override signal so indicates with the value signal for that decision node.

In step 450, the pLRU binary tree 300 is traversed from the root decision node to the LRU set leaf node that the L2 cache 170 is allowed to replace with new information. In step 460, the L2 cache 170 overwrites the replaceable pLRU leaf node set with new information if a miss of the requested data occurs within the L2 cache 170. Generally, the replaceable leaf node is the LRU leaf node that the RMT 160 has not forbidden to be overwritten.

In step 460, information within the selected leaf node is replaced. In step 465, the decision nodes of the pLRU binary tree 300 are updated according to which set had a replacement. Any decision node of the pLRU binary tree 300 which has a corresponding override signal of 1 is not updated, however. Step 465 is executed after either step 453 or from step 460.

In step 470, the logic levels of all non-overridden decision nodes in the pLRU binary tree from leaf node to root decision node are flipped. This ensures that the set just overwritten or previously accessed is interpreted as the most recently used (MRU) among the replaceable LRU leaf nodes. If step 470 is executed from step 465, the overridden signals from the last non-discarded L2 tag replacement indicia are employed.

It is understood that the present invention can take many forms and embodiments. Accordingly, several variations may be made in the foregoing without departing from the spirit or the scope of the invention. The capabilities outlined herein allow for the possibility of a variety of programming models. This disclosure should not be read as preferring any particular programming model, but is instead directed to the underlying mechanisms on which these programming models can be built.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A cache-accessing system having a binary tree with decision nodes, comprising:
 a cache comprising a plurality of sets;
 a replacement management table employable for managing a replacement policy of information associated with the plurality of sets;
 a pseudo least recently used function employable to determine the least recently used set of the cache;
 an override signal line employable to enable an overwrite of a decision node of the binary tree; and
 a value signal line employable to overwrite the decision node of the binary tree.

2. The system of claim 1, wherein the replacement management table is manageable by software.

3. The system of claim 1, wherein the replacement management table contains indicia corresponding to a locked set.

4. The system of claim 1, wherein the replacement management table contains indicia corresponding to a streaming set.

5. The system of claim 1, wherein the replacement management table is employable to receive a class identifier indicia.

6. The system of claim 1, wherein the cache is an eight-way associative cache.

7. The system of claim 1, wherein the value signal line is further employable to transmit an instruction for altering a traversal of the binary tree.

8. The system of claim 1, wherein the output of the decision node of the binary tree is coupled to a multiplexer.

9. The system of claim 1, wherein the replacement management table further comprises a class identifier row corresponding to a default entry.

10. The system of claim 1, wherein the replacement management table is employable to default multiple locked sets of the cache for a classID indicia.

11. The system of claim 1, wherein the software managing the replacement management table is employable to minimize the total number of decision nodes modified in the binary tree when modifying the node of the binary tree.

12. The system of claim 1, wherein the cache is a level two cache.

13. The system of claim 1, wherein the cache is a translation look aside buffer cache.

14. A cache accessing method employing a replacement management table to modify decision nodes of a pseudo least recently used binary tree implementation, comprising:
 generating a tag control replacement indicia as a function of an entry in the replacement management table and a class identifier indicia;
 extracting information from the tag control replacement indicia;
 creating an override signal for an associated decision node of the binary tree as a function of the extracted information;
 creating a value signal for the associated decision node of the binary tree as a function of the extracted information; and
 overwriting the associated decision node as a function of the value signal if the override signal enables the modification.

15. The method of claim 14, further comprising traversing the binary tree from the root decision node to a leaf node correlating to a set of the cache.

16. The method of claim 14, further comprising modifying the decision node of the binary tree during a traverse of the binary tree.

17. The method of claim 15, further comprising reading information from the leaf node.

18. The method of claim 15, further comprising replacing information in the leaf node.

19. The method of claim 14, wherein the override signal is a function of a class identifier.

20. The method of claim 14, wherein the value signal is a function of a class identifier.

21. The method of claim 14, further comprising generating a class identifier, wherein the class identifier is employable by the replacement management table.

22. The method of claim 14, wherein the data within the replacement management table is modifiable by software.

23. A computer program product for employing a replacement management table to modify decision nodes of a pseudo least recently used binary tree implementation, the computer program product having a computer-readable medium with a computer program embodied thereon, the computer program comprising:
 computer code for generating a tag control replacement indicia as a function of an entry in the replacement management table and a classID;
 computer code extracting information from a tag control replacement indicia;
 computer code for creating an override signal for an associated decision node of the binary tree as a function of the extraction;
 computer code for creating a value signal for the associated decision node of the binary tree as a function of the combination; and computer code for overwriting the associated decision node as a function of the value signal if the override signal enables the modification.

24. A processor for employing a replacement management table to modify decision nodes of a pseudo least recently used binary tree implementation, the processor including a computer program comprising:

computer code for generating a tag control replacement indicia as a function of an entry in the replacement management table and a classID;

computer code for extracting information from a tag control replacement indicia;

computer code for creating an override signal for an associated decision node of the binary tree as a function of the extraction;

computer code for creating a value signal for the associated decision node of the binary tree as a function of the combination; and computer code for overwriting the associated decision node as a function of the value signal if the override signal enables the modification.

* * * * *